(No Model.)

G. HAYES.
APPARATUS FOR HEATING WATER IN BATH TUBS.

No. 317,940. Patented May 12, 1885.

WITNESSES:
Jacob J. Koch
Jno. Honey

INVENTOR
Geo Hayes.

UNITED STATES PATENT OFFICE.

GEORGE HAYES, OF NEW YORK, N. Y.

APPARATUS FOR HEATING WATER IN BATH-TUBS.

SPECIFICATION forming part of Letters Patent No. 317,940, dated May 12, 1885.

Application filed August 16, 1884. (No model.)

*To all whom it may concern:*

Be it known that I, GEORGE HAYES, a resident of the city, county, and State of New York, and a citizen of the United States, have invented a new and useful Apparatus for Heating Water in Bath-Tubs, &c., of which the following is a specification.

My invention consists in a portable apparatus containing a boiler adapted to be readily immersed in water contained in or supplied to a bath-tub or other vessel, for the purpose of heating the same for bathing or other uses, medicinal or otherwise.

The apparatus is constructed with a heating-chamber therein, into which may be placed one or more of the oil-lamps used in ordinary oil-stoves, or which chamber may contain a gas-burner adapted to heating purposes, or in which may be placed a fire of charcoal or other combustible material, the said chamber being located at or near the bottom of the apparatus and supplied with air to support combustion through a supply-chamber open at the top, and having suitable outlet for the escape of the products of combustion.

The apparatus also contains a water-heating chamber, so formed and arranged therein that water may enter from the tub low down, and circulate through the same and in contact with the heating-chamber, and when heated sufficiently pass out at the opposite side of the apparatus to the interior of the tub, proper inlet and outlet apertures or tubes being provided, so that a constant circulation may be kept up until all the water in the tub has thus been passed through the apparatus, and thereby sufficiently heated.

The apparatus is provided with a handle or other means, whereby it may be lifted out readily from the tub or other vessel, and it is thereby portable and adapted for use wherever it is desirable to heat water in localities where the usual facilities are not in the house or convenient to use.

By this apparatus a body or foot bath may be taken at the bedside by a sick person when necessary. Any ordinary wash-tub may be used where it is not safe to remove the patient to the bath-room. It is also useful in country places and tenement districts where permanent bathing-tubs are not usually supplied. It is also a means of heating water for vapor-baths and other remedial purposes, keeping the water when once heated at a uniform temperature, or supplying steam therefrom when requisite.

Figure 1:
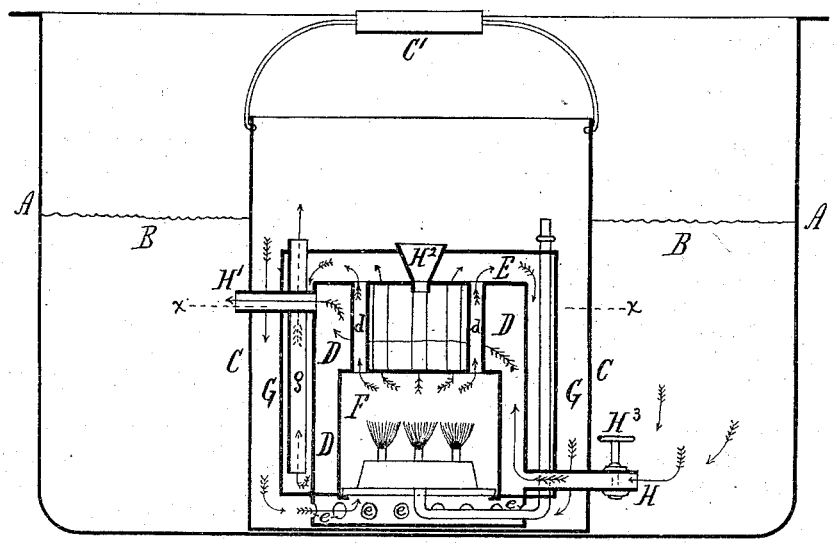
Figure 2:
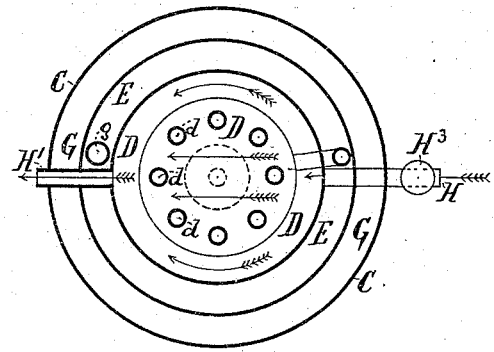

In the accompanying drawings, Figure 1 is a vertical section of a vessel or bath-tub containing water, into which has been placed one of my water-heating devices, which is also shown in vertical section. Arrows show the direction of the air, heat, and water currents. Fig. 2 is a horizontal section of the heating apparatus on the line $x$ $x$ of Fig. 1.

A represents the walls of a bath-tub or other vessel for holding water. B represents water contained therein.

C represents the heating apparatus, which may be partially or wholly immersed in the water, provided with a handle at C', by which it may be carried anywhere.

D is the boiler in which the water is heated and through which the water circulates.

E is a flue encircling the boiler.

F is the combustion-chamber, into which may be placed an oil-lamp—such as used in oil-stoves—or it may contain a gas-burner supplied through flexible and rigid tubing, or it may be provided with a grate, and charcoal or other fuel used therein.

$d$ represents tubing through which the products of combustion pass from combustion-chamber F to hot-air flue E, escaping therefrom through tube $g$.

G represents the air-supply chamber, apertures at $e$ admitting the air to combustion-chamber F. The supply-chamber is open at the top.

H represents a tube crossing the air-chamber G to pass the water from the bath-tub into the boiler or water-heating chamber D.

At H' is an outlet-tube through which the heated water escapes to the tub again after passing through the boiler D.

$H^2$ represents a funnel through which water may be poured into the boiler.

$H^3$ represents a cock, which serves to retain water whenever necessary, previous to immersing the apparatus into the water of the bath-tub and before fire is made, to prevent the burning of the parts. A supply-pipe for gas or oil is shown extending from the burner to and upward in the air-supply chamber G.

The several inclosing-walls, as well as the tubes and other parts of the apparatus, may be composed of any suitable material—such as copper, galvanized iron, or cast-iron—and I do not confine myself to any particular shape of the exterior or any of the interior parts.

The tubes running upward through the boiler or water-heating chamber may be all comprised in one coiled tube, or such other form as would be suitable.

What I claim as new, and desire to secure by Letters Patent of the United States, is—

1. A portable apparatus, C, adapted for submersion in wash and bath tubs, as a means of heating water therein, containing within itself a water-heating chamber, D, a hot-air flue or chamber, E, a combustion-chamber, F, and a cold-air supply-chamber, G, arranged substantially as shown and described.

2. In a portable heating apparatus adapted for submersion in wash-tubs, bath-tubs, and similar vessels, the combination of combustion-chamber F and cold-air supply-chamber G, connected by apertures $e$, and the chamber F, provided with outlets $d$, substantially as shown and described.

3. In the water-heating apparatus C, the combination of chambers F and G, connected by apertures $e$, tubing $d$, hot-air flue or chamber E, and outlets $g$ arranged therein, substantially as shown and described.

4. In the water-heating apparatus C, the combination of inlet-tubing H, water-heating chamber D, and outlet-tubing H', the water-chamber D, surrounded, incased, or jacketed by a hot-air chamber or flue, E, and itself jacketing and partially or wholly surrounding or incasing a chamber provided with a heating medium, substantially as shown and described.

5. In the water-heating apparatus C, the combination of chambers D and F, connected by apertures $e$, hot-air flue E, cold-air flue or chamber G, tubing $d$, and tubing $g$, with water-inlet H and outlet H', substantially as shown and described.

GEO. HAYES.

Witnesses:
JNO. HOVEY,
JACOB J. KOCH.